United States Patent [19]

Kasselmann et al.

[11] 3,825,305
[45] July 23, 1974

[54] ADAPTIVE BRAKING SYSTEM

[75] Inventors: John T. Kasselmann, Southfield;
George B. Hickner, South Bend;
Donald W. Howard, South Bend;
James M. Needham, South Bend, all of Ind.

[73] Assignee: The Bendix Corporation, South Bend, Ind.

[22] Filed: June 16, 1972

[21] Appl. No.: 263,520

[52] U.S. Cl. .............................. 303/21 BE, 303/20
[51] Int. Cl. ............................................. B60t 8/12
[58] Field of Search .............. 188/181; 303/20, 21; 317/5; 324/161–162; 340/52 B, 262–263

[56] References Cited
UNITED STATES PATENTS

| | | | |
|---|---|---|---|
| 3,556,610 | 1/1971 | Leiber | 303/21 P |
| 3,578,819 | 5/1971 | Atkins | 303/21 P UX |
| 3,583,773 | 6/1971 | Steinbrenner et al. | 303/21 EB |
| 3,584,921 | 6/1971 | Crawford | 303/20 X |
| 3,604,762 | 9/1971 | Ando et al. | 303/21 BE |
| 3,635,530 | 1/1972 | Packer et al. | 303/21 P |
| 3,640,588 | 2/1972 | Carp et al. | 303/21 P |
| 3,690,735 | 9/1972 | Arai et al. | 303/21 P |
| 3,710,186 | 1/1973 | Sharp | 303/21 BE X |
| 3,713,705 | 1/1973 | Michellone et al. | 303/21 P |

*Primary Examiner*—Milton Buchler
*Assistant Examiner*—Stephen G. Kunin
*Attorney, Agent, or Firm*—Ken C. Decker; William N. Antonia

[57] ABSTRACT

An adaptive braking system for an automotive vehicle is disclosed which includes a speed reacquisition feature which precludes termination of a brake pressure decay cycle until the controlled wheel attains a predetermined percentage of the angular velocity at which the wheel was rotating at the time that the decay cycle was initiated. The adaptive braking system includes the usual comparator which compares wheel acceleration to a predetermined reference level and generates a signal initiating a decay cycle when the wheel decelerates in excess of the reference level. The output signal of the comparator also enables a speed memory circuit which memorizes a predetermined percentage of the wheel speed. A comparator compares the instantaneous wheel speed during the decay cycle with the memorized value, and generates a signal which may maintain the decay cycle even though the wheel reaccelerates past an acceleration reference level which would normally terminate the decay cycle.

6 Claims, 4 Drawing Figures

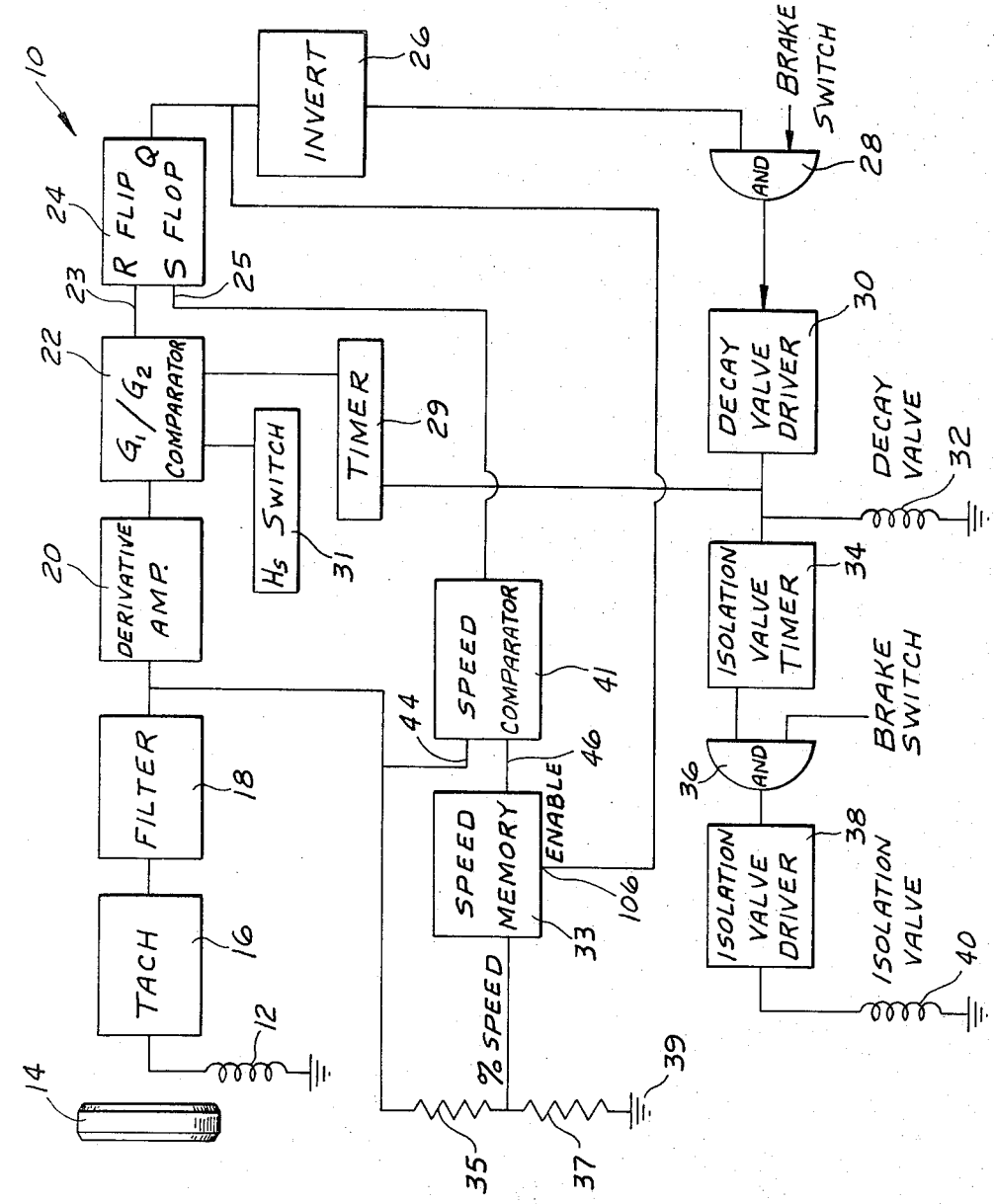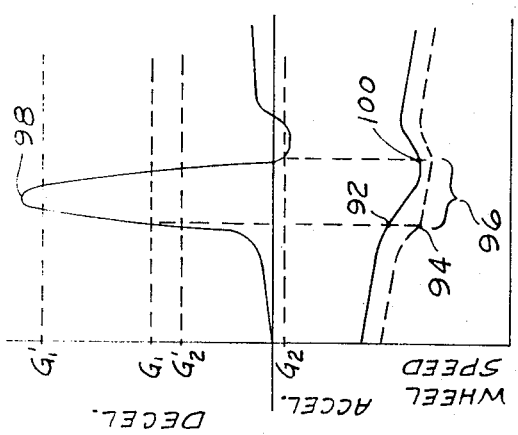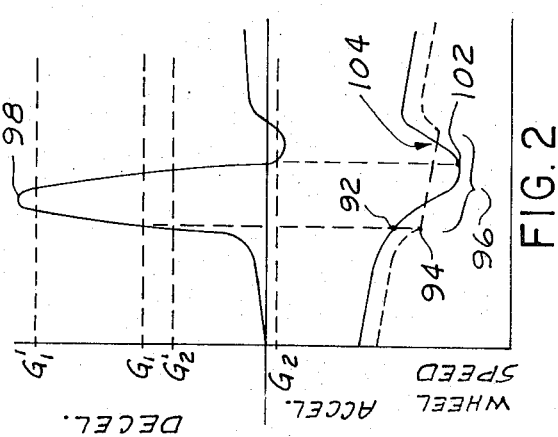

3,825,305

ADAPTIVE BRAKING SYSTEM

BACKGROUND OF THE INVENTION

This invention relates to an adaptive braking system for an automotive vehicle.

Most existing automotive adaptive braking systems initiate a brake pressure decay cycle when wheel deceleration drops below a predetermined level, and terminate the decay cycle and initiate a brake pressure build cycle when the wheel reaccelerates past another predetermined acceleration reference level. While this system works quite well under most circumstances, on certain braking maneuvers on particular types of surfaces, the wheel speed may drop so low that it is still quite close to lock even though the wheel may reaccelerate to a value sufficient to terminate the brake pressure decay cycle. If the decay cycle is terminated while the wheel is quite close to lock, even though it may be reaccelerating rapidly, the subsequent brake pressure build may throw the wheel into a locked or skidding condition before the adaptive braking system may react to initiate another decay cycle. In prior art adaptive braking systems this fact was compensated for by providing a decay rate greater than was desirable.

SUMMARY OF THE INVENTION

An important object of our invention is to provide an adaptive braking system for an automotive vehicle which includes a speed reacquisition feature that requires that the controlled wheel reaccelerates to a predetermined percentage of its angular velocity at which it was rotating at the time the decay cycle was initiated.

Another important object of our invention is to provide an adaptive braking system having a decay rate which is much lower than comparable adaptive braking systems known to the art.

Still another important object of our invention is to improve the performance and reliability of an adaptive braking system.

DESCRIPTION OF THE DRAWINGS

FIG. 1 is a graphical representation of wheel accelerations versus time and wheel speeds versus time of an operation of an adaptive braking system made pursuant to the teachings of our present invention illustrating a cycle in which the speed recovery mode of the system is not used;

FIG. 2 is a graphical representation similar to FIG. 1 but illustrating a cycle in which the speed recovery mode of the system is used;

FIG. 3 is a block diagram of an adaptive braking system made pursuant to the teachings of our present invention.

DETAILED DESCRIPTION

Figure 4:
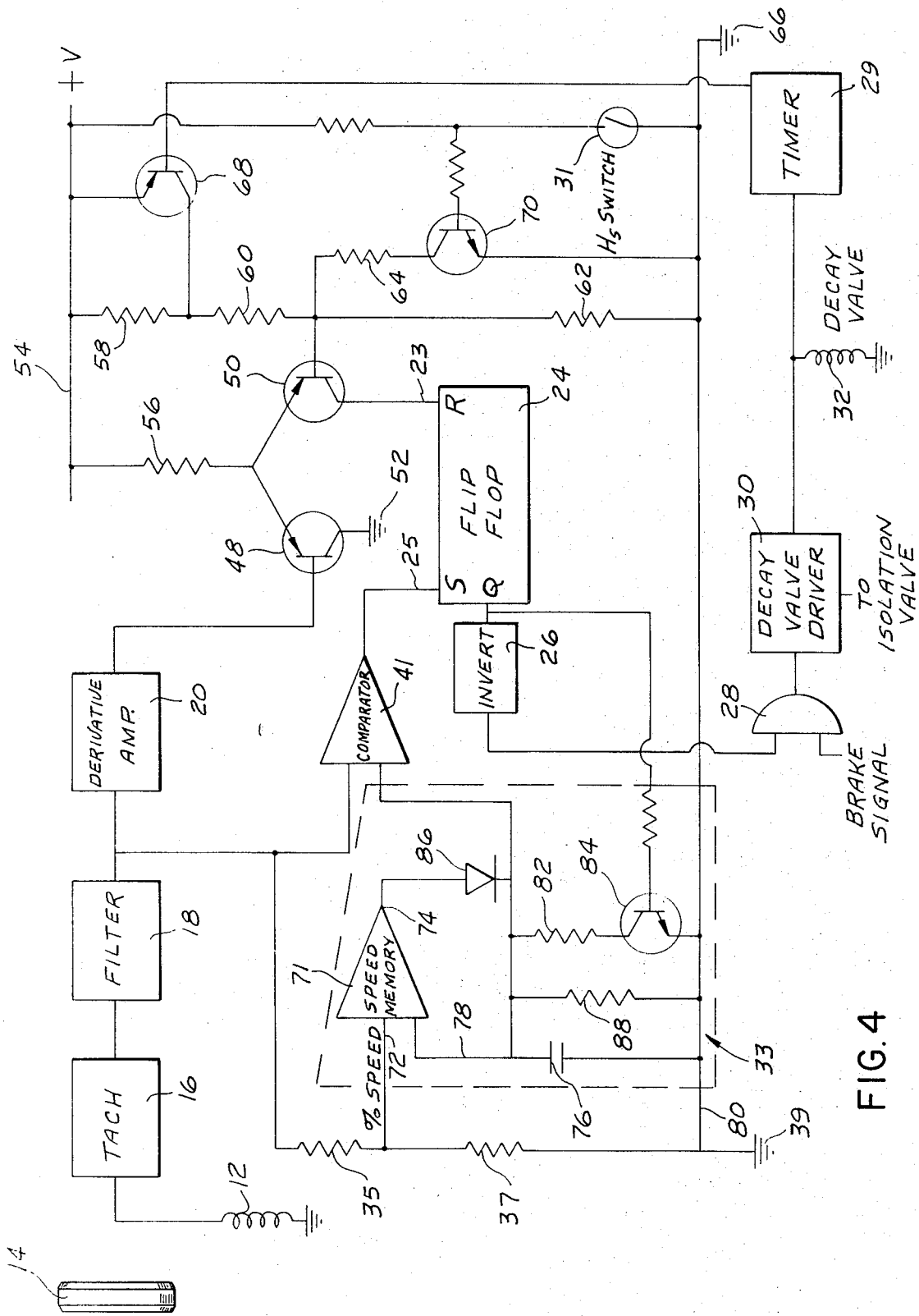
FIG. 4 is a more detailed illustration of the block diagram illustrated in FIG. 3 which shows circuit details of many of the more important components of our system.

Referring now to FIG. 3 of the drawings, an adaptive braking system generally indicated by the numeral 10 includes an electro-magnetic wheel speed sensor 12 which is responsive to the rotational speed of the controlled wheel of the vehicle 14. The wheel speed sensor 12 is of the conventional electro-magnetic type which produces an alternating voltage output, its output varying in proportion to the angular velocity of the wheel 14. Since the electro-magnetic wheel speed sensor 12 is of a completely conventional type, it will not be further described herein. The alternating voltage produced by the wheel speed sensor 12 is converted by the tachometer 16, to a pulsed output the frequency of which is proportional to that of the wheel speed sensor input. The pulsed output produced by the tachometer 16 is processed by a conventional low-pass filter 18, so the output of the filter 18 is a voltage signal which is proportional to the angular velocity of the wheel 14. The output signal of the filter 18 is differentiated by a derivative amplifier 20, of a conventional design well known to those skilled in the art. The derivative amplifier 20 includes an inverter, so that positive values of the output voltage of the amplifier 20 represent wheel deceleration and negative values represent wheel acceleration. The output of the amplifier 20 is transmitted to a comparator 22, which will be described in detail hereinafter. Suffice it to say, however, that the comparator 22 compares the output of the derivative amplifier 20 with a reference signal corresponding to the $G_1$ deceleration level as represented in FIG. 1. Whenever the input to the comparator 22 exceeds this $G_1$ voltage level, the comparator 22 produces a control signal which is transmitted to the reset input 23 of a flip-flop 24. The flip-flop 24 is of a conventional type having the following truth table:

| R | S | $Q^{n+1}$ |
|---|---|---|
| 0 | 0 | $Q^n$ |
| 0 | 1 | 1 |
| 1 | 0 | 0 |
| 1 | 1 | 0 |

In other words, if the signals to both the reset input 23 and the set input 25 of the flip-flop 24 have logic levels of 0, the flip-flop remains in its existing state. However, if a signal having a logic level of 1 is transmitted to the reset input 23, the Q output will be at a logic level of 0. Similarly, if the signal transmitted to the reset input 23 has a logic level of 0 while the signal transmitted to the set input 25 has a logic level of 1, the Q output will have a logic level of 1. As will be discussed in detail hereinafter, the signal transmitted to the set input 25 normally has a logic level of 1.

When the control signal is received at the reset input 23 of the flip flop 24, the positive output or Q of the latter changes states, from a logic level of one to a logic level of 0. The Q output of the flip-flop 24 is inverted by an inverter 26. Therefore, upon generation of the control signal from the comparator 22, a signal having logic level of one is transmitted to one of the inputs of an AND gate 28, the other input of the latter being connected to the stoplight switch of the vehicle so that the AND gate 28 produces an output signal only when the Q output of the flip flop 24 is at a logic level of 0 and the brakes of the vehicle have been applied. The positive output of the AND gate 28 actuates the decay valve driver circuitry 30, which is of conventional construction well known to those skilled in the art and which consists primarily of an amplifier which actuates the decay valve represented by the coil 32 in FIG. 3. The output of decay valve driver 30 also actuates the isolation valve timer 34, the output of which is transmitted to one of the inputs of AND gate 36, the other input being connected to the aforementioned stoplight switch. The output of AND gate 36 is connected to an isolation valve driver circuitry 38. The isolation valve driver circuitry 38 controls the operation of the solenoid-actuated isolation valve which is represented in FIG. 3 by the coil 40. The valves 32 and 40 are more completely disclosed in copending U.S. Pat. application Ser. No. 179,919, filed Sept. 13, 1971, owned by the assignee of the present invention and incorporated herein by reference. The isolation valve timer 34 is actuated by the decay valve driver 30 and insures that the isolation valve 40 will remain on for a predetermined time after the longest anticipated actuation of the decay valve 32.

A positive output from the decay valve driver 30 also actuates a timer mechanism generally indicated by the numeral 29 in FIG. 3. The timer mechanism 29 is of conventional construction and produces an output signal for a predetermined time period after a positive input signal is received. The timer is effective to switch the comparator 22 from the $G_1$ reference level to the $G_2$ reference level once the comparator has generated an output control signal to the reset input 23 of flip-flop 24. Therefore, referring to FIGS. 1 and 2, while the decay valve driver 30 will be turned on when the wheel 14 decelerates to the $G_1$ level, it will not be turned off until the wheel reaccelerates to an acceleration level represented by the $G_2$ level in FIGS. 1 and 2. If the wheel acceleration does not reach the $G_2$ acceleration level before the period of the timer 29 expires, the comparator 22 will be switched back to the $G_1$ reference level, so that the valve 32 will be turned off if the wheel deceleration becomes less than the $G_1$ reference level. A mercury switch generally indicated by the numeral 31 also controls the $G_1/G_2$ comparator and changes the reference level of both $G_1$ and $G_2$ if the vehicle is decelerating above a predetermined rate. Since the rate of vehicle deceleration is roughly indicative of the coefficient of friction between the wheels of the vehicle and the surface across which they are traversing, the mercury switch 30 is effective to increase the $G_1$ and $G_2$ reference levels when the vehicle is traversing a surface having a high coefficient of friction. This is most desirable, since higher wheel decelerations may be tolerated on a high coefficient surface before the wheel locks to throw the vehicle into a dangerous skid. Details of the construction of the mercury switch 30 are disclosed in U.S. Pat. No. 3,525,553 owned by the assignee of the present invention and incorporated herein by reference. The manner in which the mercury switch changes the $G_1$ and $G_2$ reference levels will be more completely disclosed hereinafter.

The output of the inverter 26 is also transmitted to the enable input 106 of a speed memory 33. A pair of resistors 35 and 37 define a voltage dividing network and are connected between the output of the filter 18 and the electrical ground at 39. The input to the speed memory 33 is connected between the resistors 35 and 37 and therefore transmits a voltage to the speed memory 33 which is proportional to a predetermined percentage of the rotational speed of the wheel 14, the percentage being controlled by the relative values of the resistors 35 and 37. In practice, it has been found desirable to memorize a voltage representing approximately 80 percent of the speed of the wheel 14. Therefore, when a positive signal is received at the enable input 106 of the speed memory 33, the memory 33 memorizes a signal corresponding to the predetermined percentage of the then existing speed of the wheel 14. The output of the speed memory 33 is transmitted to a speed comparator generally indicated by the numeral 41, and the other input of the comparator 41 is connected to the output of the filter 18, which is an electrical signal which varies directly with the speed of the wheel 14. The output signal generated by the comparator 41 normally has a logic level of 1, but switches to transmit a signal having a logic level of 0 to the set input 25 of the flip-flop 24 whenever the speed received at the terminal 44 of the comparator 41 is less than the memorized value stored in speed memory 33 connected to the input terminal 46 of speed comparator 41, it being realized that the value stored in the speed memory 33 is equal to the predetermined percentage of the wheel speed existing at the time the decay cycle was initiated. Therefore, as long as the speed of the wheel 14 is less than the predetermined percentage of the wheel speed existing at the time the decay cycle was initiated, the Q output of the flip-flop 24 will remain at a logic state 0, since the input signals received at both the set terminal 25 and the reset input 23 of the flip-flop 24 have 0 logic levels. Therefore, since the Q output of flip-flop 24 remains at a 0 level, and since this output is inverted by inverter 26, the decay valve 32 will remain on until the wheel speed exceeds the memorized value stored in the speed memory 33.

It has been found desirable to provide a relatively slow decay of the memorized value stored in the speed memory 33, so that the longer the decay valve remains on, the lower the speed of the wheel 14 will be required in order to turn the decay valve 32 off. This decay is necessary since under some conditions of operation of the adaptive braking system 10 the vehicle may decelerate sufficiently during the first cycle of the adaptive braking system after a brake application is initiated that the memorized speed would never be reattained, thereby leaving the decay valve 32 turned on. Details of the operation and construction of this bleed from the decay memory will be described in detail hereinafter.

Referring now to FIG. 4 of the drawings, the comparator 22 includes a pair of transistors 48, 50. Transistor 48 is connected between an electrical ground as at 52 and through a resistor 56 to a supply line 54 which is maintained at a constant voltage by a power supply (not shown). The base of the transistor 48 is connected to the output of the derivative amplifier 20. Transistor 50 is connected between the supply line 54 through resistor 56 and the reset input 23 of flip-flop 24. The voltage dividing network, consisting of resistors 58, 60, 62, and 64 which are connected between the supply line 54 and the electrical ground as at 66, establishes the bias on the base of the transistor 50. A transistor 68 is connected around the resistor 58, and the bias on the base of the transistor 68 is controlled by the output of the timer 29. Since normally there is no output from the timer 29, and normally the transistor 68 is conductive, the resistor 58 is normally switched out of the voltage dividing network establishing the bias on the base of the transistor 50. Resistor 64 is connected in series with a transistor 70, and the transistor 70 and resistor 64 are connected in parallel with the resistor 62. The bias on the base of the transistor 70 is controlled by the mercury switch 31, which is connected between the voltage supply line 54 and ground. Since normally the mercury switch is open and the transistor 70 is conducting, the resistor 64 is switched in parallel with resistor 62. However, when the vehicle is traversing a road surface which has a relatively high coefficient of friction when a brake application is initiated, the resultant rather rapid vehicle deceleration closes the mercury switch 31 grounding the base of transistor 70 making it non-conductive to switch the resistor 64 out of the voltage dividing network, to thereby raise the bias on the base of transistor 50.

Normally, transistor 48 is turned on, so that the resistor 56 is connected directly to the ground as at 52, thereby suppressing all electrical signals through the transistor 50 to the reset input 23 of flip-flop 24. However, when the output of the derivative amplifier 20, which is proportional to the deceleration of the controlled wheel 14, exceeds the bias established on the base of transistor 50 by the voltage dividing network, transistor 48 will be turned off and transistor 50 will be turned on, to thereby transmit an electrical signal to the reset input 23 of flip flop 24 which actuates the decay valve driver mechanism as mentioned hereinabove. It must be remembered that normally the bias on the base of transistor 50 is established by the resistors 60, 62 and 64. This represents the $G_1$ level shown on FIG. 1. After the reset input 23 of flip flop 24 is actuated, the timer 29 is also actuated as described hereinabove, thereby turning off the transistor 68 to switch the resistor 58 into the voltage dividing network to thereby lower the bias on the base of the transistor 50. When the transistor 68 is switched, the bias on the base of transistor 50 is changed to correspond with the $G_2$ reference level on FIG. 1. Therefore, while a relatively low deceleration is required to initially render transistor 50 conductive to reset the flip-flop 24, a lower voltage output of the derivative amplifier 20 is required to turn the transistor 50 back off. Similarly, when the vehicle is traversing the surface having a relatively high coefficient of friction when the brakes are applied, the mercury switch 31 will be closed, thereby switching the transistor 70 off to switch resistor 64 out of the voltage dividing network, thereby raising the bias on the base of the transistor 50. Therefore, since the resistor 60 or the series combination of resistors 58 and 60 are connected in series with the resistor 62, both the $G_1$ and $G_2$ reference levels will be raised by operation of the mercury switch, but the difference between the $G_1$ and $G_2$ reference levels will remain the same.

Referring now to the speed memory circuit, generally indicated by the numeral 33, a speed memory amplifier 71 has an input 72 which is connected between the resistors 35 and 37 which comprise the aforementioned voltage dividing network which regulates speed memory 33 so that the voltage between the resistors is proportional to the aforementioned predetermined percentage of wheel speed. The amplifier 71 is merely a conventional operational amplifier with a gain of one, so that the amplifier 71 need not be disclosed in detail. Therefore, the voltage appearing at the output terminal 74 of the speed memory 71 is also proportional to the predetermined percentage of speed of the wheel 14. Capacitor 76 is connected between another input 78 of the amplifier 71 and the ground line 80. A relatively small resistor 82 and a transistor 84 are connected in parallel with capacitor 76. The bias on the base of the transistor 84 is established by the Q output of the flip-flop 24. Therefore, when the output signal from the flip flop 24 is at a high voltage level, which is its normal state, the transistor 84 will be turned on thereby providing a discharge path through the relatively small resistor 82 for the capacitor 76. As long as the wheel 14 is rotating, the instantaneous voltage across the capacitor 76 will be proportional to the predetermined percentage of wheel speed established by the resistors 35 and 37. However, when the output of flip-flop 24 switches to a logic level of zero, the resistor 82 will be switched out of the circuit and therefore the voltage then existing across the capacitor 76 will be stored. As pointed out hereinabove, this voltage corresponds to the predetermined percentage of wheel speed at the time the decay valve is actuated. An isolating diode 86 is provided to isolate the capacitor 76 so that the charge existing across the latter when the transistor 84 is turned off cannot bleed back through the speed memory amplifier 71. A resistor 88, of a relatively large value, is connected in parallel with the capacitor 76 and bleeds the charge from the latter at a predetermined rate. This rate is equal to the decay of the value stored in the speed memory 32 as mentioned hereinabove. This rate of decay will be dependent upon the relative value of the resistor 88 and the capacitor 76.

One input of the comparator 41 is connected to the capacitor 76 and a second input of the comparator 41 is connected to the output of the filter 18, where it transmits a signal to the comparator 41 which is proportional to the instantaneous speed of the controlled wheel 14 as pointed out hereinabove. The output signal of comparator 41 normally has a logic level of 1. Whenever the signal which is representative of the instantaneous wheel speed drops below that of the capacitor 76, the comparator 41 switches to generate an output signal having a 0 logic level which is transmitted to the set input 25 of the flip flop 24, where it maintains the Q output of flip-flop 24 at a zero logic level as pointed out hereinabove. The decay valve therefore remains on as long as the 0 logic level signal is generated by the comparator 41.

MODE OF OPERATION

In the following discussion, the solid lines on the lower curves of FIGS. 1 and 2 represent true wheel speed and the dashed lines represent the predetermined percentage of true wheel speed which is stored in the speed memory 33 during an adaptive braking cycle. Referring now particularly to FIGS. 1 and 2 of the drawings, an antiskid cycle is initiated whenever the wheel deceleration, as illustrated by the uppermost graphs of FIGS. 1 and 2, exceeds the $G_1$ reference level. In the ensuing discussion, it will be assumed that the vehicle is operating on a low coefficient surface so that the mercury switch will be open to insure operation of the antiskid system whenever wheel deceleration exceeds the $G_1$ reference level and to terminate the signal to the reset input 23 of flip-flop 24 whenever the wheel acceleration exceeds the $G_2$ reference level. Of course, if the vehicle is operating on a high coefficient system, the antiskid system works in exactly the same way except that a much higher $G_1$ deceleration level is required, as represented by the $G_1'$ acceleration on FIGS. 1 and 2, and a correspondingly higher $G_2$ deceleration level is required in order to terminate the signal to the reset input 23 of flip-flop 24 as represented by $G_2'$ reference level in FIG. 1. As pointed out hereinabove, when wheel deceleration exceeds the $G_1$ reference level, a signal is transmitted to the reset input 23 of flip-flop 24 which actuates the decay valve 32. As can be seen from the lower graph on FIG. 1, the corresponding wheel speed when the $G_1$ deceleration level is reached is represented by numeral 92. When the decay valve is actuated, a value equal to, for example, 80 percent of the wheel speed existing at that instant is memorized in the speed memory circuit 32. This value corresponds to the point 94 on the lower curves of FIGS. 1 and 2. As also was pointed out hereinabove, the value stored in the speed memory 33 is decayed at a predetermined rate. This rate is represented by the dashed line 96 in FIGS. 1 and 2, the slope of which is equal to the decay rate of the value stored in memory 33.

When the decay valve is actuated when a $G_1$ deceleration reference level is attained, the wheel continues to decelerate until it reaches a peak represented by the numeral 98 on the upper graphs of FIGS. 1 and 2 due to time lags in the system and then it begins to accelerate until it reaches a $G_2$ acceleration level as illustrated in the upper graphs of FIGS. 1 and 2. If wheel speed follows the solid curve on the lower graph of FIG. 1, the wheel speed corresponding to the $G_2$ acceleration level is represented by point 100 on FIG. 1. Since the point 100 is higher than the line 96 corresponding to the memorized value of instantaneous wheel speed, the decay valve closes and the adaptive braking cycle terminates. However, under some braking conditions, the wheel speed will follow the solid line illustrated in the lower graph of FIG. 2, so that the wheel decelerates to a much lower speed before the adaptive braking cycle can permit the wheel to reaccelerate. Such a cycle is represented by the solid line in the lower graph of FIG. 2. As can be seen from this graph, the instantaneous wheel speed when the $G_2$ acceleration level is reached, represented by point 102 in FIG. 2, is much closer to 0 wheel speed, than it was when the $G_2$ acceleration level was attained in FIG. 1. Since the brakes were reapplied while the wheel was rotating this slowly the wheel could immediately lock up before the antiskid system could react, it is desirable to maintain the decay valve on until the wheel speed recovers. This is achieved by the memory circuit 33, the comparator 41, and the set input 25 of flip-flop 24, which prevents termination of the signal to the decay valve until the wheel speed accelerates above the line 96, as represented by a point 104 in FIG. 2. When the speed of the wheel exceeds the memorized value stored in the speed memory 33, as represented by the point 104 in FIG. 2, the decay valve is turned off and the adaptive braking cycle is terminated at that time.

In conclusion, an adaptive braking cycle is always initiated by wheel deceleration which exceeds the $G_1$ acceleration reference level. However, an adaptive braking cycle may be terminated by any of three occurrences. If the wheel accelerates past the $G_2$ acceleration reference level, and the speed of the wheel exceeds the value stored in the speed memory 32, the cycle is terminated. The cycle is also terminated if the time period of the timer 29 expires and wheel deceleration does not exceed the $G_1$ reference level and the wheel speed exceeds the value stored in the speed memory 33. The third manner in which the adaptive braking cycle may be terminated is the condition in which the wheel speed remains below the value stored in the speed memory circuit 33 when the wheel acceleration exceeds the $G_2$ reference level. When this occurs, the adaptive braking cycle is terminated only when the wheel speed accelerates above the value stored in the speed memory 33.

We claim:

1. In a wheeled vehicle having a brake for braking a corresponding wheel, an adaptive braking system for controlling said brake to prevent skidding of said corresponding wheel comprising:
   electrically operated valve means for relieving braking pressure in said brake controlling said corresponding wheel to prevent skidding of the latter; and
   control means for actuating said valve means including means for generating a speed signal proportional to the angular velocity of said wheel, means for differentiating said speed signal to generate a signal proportional to acceleration and deceleration of said wheel, means for comparing said last-mentioned signal to first and second reference values and generating a first control signal when the value of the acceleration and deceleration signal drops below the value of said first reference level and terminating said first control signal when the value of the acceleration and deceleration signal increases above the value of said second reference signal, logic means having a first input terminal connected to said comparing means, a second input terminal, and an output terminal connected to said valve means, said logic means generating an output signal actuating said valve means when signals are transmitted to both of said input terminals or to said first input terminal alone, said logic means extinguishing the output signal on said output terminal if a signal is transmitted to said second input terminal alone, the output signal on said output terminal being unaffected if the signals on both of said input terminals terminate, and memory means responsive to generation of said output signal to memorize a value corresponding to a predetermined percentage of the value of said speed signal, means for comparing said memorized value with the instantaneous value of said speed signal and generating a control signal if said instantaneous value of said speed signal is greater than said memorized value, said last-mentioned control signal being transmitted to the second input terminal of said logic means.

2. The invention of claim 1:
   said memory means memorizing a predetermined percentage of said speed signal, said predetermined percentage being less than the full value of said speed signal.

3. The invention of claim 2:
   said memory means including a capacitor, said capacitor being charged to a voltage corresponding to said predetermined percentage of said wheel speed, a discharge circuit in parallel to said capacitor, switch means controlling said discharge circuit whereby the capacitor is continually charged as long as said switch means is closed, said switch means being opened in response to initial generation of said output signal so that the voltage across said capacitor when said output signal is generated is retained.

4. The invention of claim 3;
said discharge circuit including resistor connected in parallel with said capacitor so that the voltage retained across the latter when said switch means is opened is decayed through said resistor at a predetermined rate.

5. The invention of claim 1:
said control means including means for decaying said memorized value at a predetermined rate after actuation of the memory means by generation of the output signal.

6. The invention of claim 1:
said memory means including a capacitor, said capacitor being charged to a voltage corresponding to said predetermined percentage of said wheel speed, a discharge circuit for said capacitor including a relatively large resister in parallel with said capacitor and a smaller resistor and switching means controlling said smaller resistor in parallel with said capacitor and with said larger resistor, said switch being normally closed but opening in response to said output signal.

* * * * *